United States Patent [19]
Ward et al.

[11] Patent Number: 4,461,005
[45] Date of Patent: Jul. 17, 1984

[54] HIGH PEAK POWER, HIGH PRF LASER SYSTEM

[76] Inventors: Ernest M. Ward, 6308 Jebel, El Paso, Tex. 79912; Eugene L. Curry, 5 Otranto Club, Hannahan, S.C. 29410; Richard J. Newton, Rte. 2, Box 341 K, Las Cruces, N. Mex. 88001

[21] Appl. No.: 200,664

[22] Filed: Oct. 27, 1980

[51] Int. Cl.³ .............................................. H01S 3/00
[52] U.S. Cl. ...................................... 372/10; 372/12; 372/13; 372/25; 372/108
[58] Field of Search ................... 372/10, 12, 13, 108, 372/94, 99, 100, 25

[56] References Cited

U.S. PATENT DOCUMENTS

| | | | |
|---|---|---|---|
| 3,538,453 | 11/1970 | Miller | 372/108 |
| 3,566,303 | 2/1971 | DeMaria | 372/13 |
| 3,711,791 | 1/1973 | Erickson | 372/10 |

*Primary Examiner*—James W. Davie

[57] ABSTRACT

A laser system and method is disclosed which is capable of producing high peak power, high pulse rates, and narrow pulses. The invention comprises an acousto-optic shutter and a frustrated total internal reflectance Q-switch in a unique configuration which allows maximum power to be obtained from the laser device while still achieving high pulse rate and narrow pulse width.

11 Claims, 4 Drawing Figures

HIGH PEAK POWER, HIGH PRF LASER SYSTEM

RIGHTS OF THE GOVERNMENT

The invention described herein may be manufactured, used and liscensed by or for the United States government for governmental purposes without the payment to us of any royalty thereon.

BACKGROUND OF THE INVENTION

For many applications of laser techniques, it is often desirable to have a laser device capable of producing output having high peak power, high pulse rate and narrow pulse width. Several techniques have been developed in the art in an effort to attain such output.

There are two major difficulties in developing a high peak power, high pulse repetition frequency solid state laser system. Thermal problems are present due to high average powers, and narrow pulse widths are difficult to obtain due to the low gain of a continuous wave pumped oscillator. A technique of the prior art uses an acousto-optic Q-switch which can sustain high average powers. However, such a device produces long pulse widths due to a low gain cavity and slow switching time. Another approach uses electro-optic Q-switches in a pseudo cavity dumping technique which yields narrow pulses and high peak powers at low pulse repetition frequencies. This system, however, becomes unstable due to thermal induced birefringence when the high average powers of high pulse repetition frequencies are encountered.

Accordingly, it is an object of this invention to provide a laser system which overcomes the above noted disadvantages inherent in the devices of the prior art.

It is an object of this invention to provide a solid state laser device which is capable of producing output having high peak power, high pulse repetition frequency and narrow pulses.

SUMMARY OF THE INVENTION

The present invention provides the highest ratio of peak power to average power presently attainable in a continuous wave pumped laser. High peak powers and high pulse rates are obtained by using two types of modulators, an acousto-optic shutter and a frustrated total internal reflectance (FTIR) Q-switch. Both devices operate efficiently at high average powers and the FTIR switches very rapidly. The laser system of the present invention effectively overcomes the problems associated with the prior art approaches.

DESCRIPTION OF A PREFERRED EMBODIMENT

Figure 1:
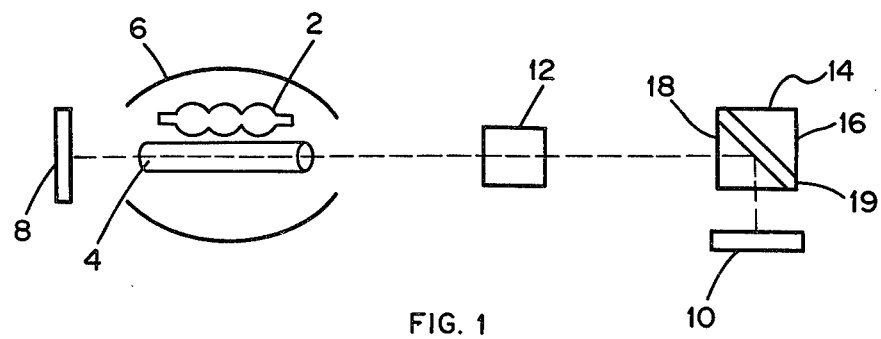
FIG. 1 illustrates schematically a solid state laser device constructed in accordance with the present invention, having the FTIR in its reflective state.

FIG. 1 schematically illustrates a solid state laser device constructed in accordance with the present invention. The apparatus may comprise, for example, an Nd:YAG (neodymium: yttrium aluminium garnet) laser. The laser device comprises essentially a flash tube 2, rod 4 comprising the laser medium, and reflectors 6. The mode of operation of this device is well-known and documented in the art. (Note Beesley, Lasers and Their Applications, Barnes and Noble, Inc., New York, 1971). The apparatus additionally comprises 100 percent reflecting mirrors 8, 10, acousto-optic shutter 12, and an FTIR Q-switch 14.

Figure 3A:
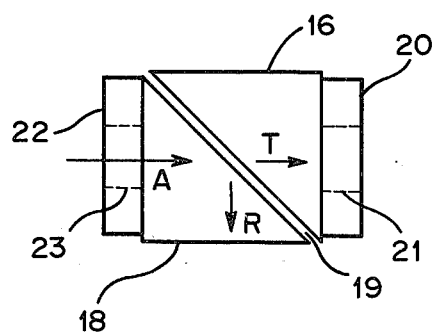
FIGS. 3a–3b illustrate in greater detail the FTIR device utilized in the system of the present invention.
Figure 3B:
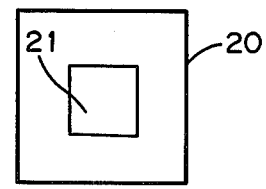

As illustrated in FIGS. 3a and 3b, the FTIR comprises generally two prisms 16, 18 separated from one another by a gap 19. Arrow A in FIG. 3a represents radiant energy entering the FTIR. When the dimension of gap 19 is greater than one wavelength of the incident radiation, the FTIR will reflect the radiation in the direction of arrow R in FIG. 3a. If the dimension of the gap is less than one wavelength, the radiant energy will be transmitted through the gap as indicated by arrow T in FIG. 3a. Relative movement of prisms 16 and 18 therefore switch the FTIR from a totally reflective state to a totally transmissive state.

In order to effect relative movement of the prisms, piezoelectric devices 20 and 22 may be associated with prisms 16 and 18, respectively. The piezoelectric transducers 20 and 22 comprise material which expands upon the application of an electric impulse thereto. Upon application of such an impulse, the transducers bulge to force the prisms to move relatively closer to one another. Openings 21 and 23 may be provided in the transducers 20 and 22, respectively, in order to allow for passage of light therethrough. An FTIR device as described above is available from Erickson Laser Products, Silver Spring, Maryland.

In operation, the flash tube illumination initially holds the energy in the rod 4 above threshold but lasing is prevented by the acousto-optic shutter. When the acousto-optic shutter opens, lasing begins. It is to be noted that no pumping synchronization is required in this system. At this point, the FTIR is in a totally reflective state as illustrated in FIG. 1. The beam is reflected by the FTIR and the energy is completely contained in the interferometer made up of the two 100 percent reflective mirrors 8 and 10. The path of the reflective beam is represented by the dashed line in FIG. 1.

Figure 2:
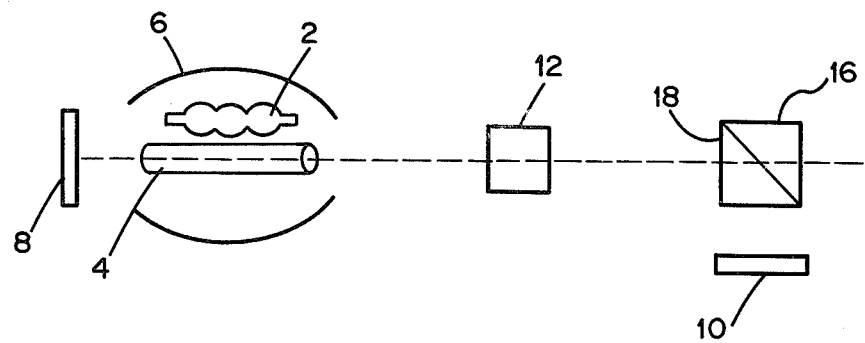
FIG. 2 illustrates the laser system of FIG. 1 having the FTIR Q-switch in its transmissive state.

The beam is allowed to circulate in the interferometer until all of the extractable energy is depleted from the rod. The FTIR is then quickly changed from totally reflective to totally transmissive, and all of the energy is quickly dumped from the system, as illustrated in FIG. 2. Because the prisms 16 and 18 of the FTIR are spaced from one another by a very small distance (on the order of one micron) the action of piezoelectric transducers 20 and 22 can very rapidly bring the prisms closer together in order to render the FTIR totally transmissive.

The disclosed laser system utilizes unique switching concepts which provide previously unattainable laser pulse parameters which are extremely useful in many applications. The system of the present invention represents an advancement in the state of the art of high peak power laser systems that operate at pulse rates of several thousand Hertz. The present system provides high peak power, high pulse rate, and narrow pulses in a combination which has never been attainable in solid state lasers utilizing standard Q-switching techniques. The unique configuration of the acousto-optic shutter and the FTIR Q-switch can withstand very high average powers, allowing the laser system to operate at very high pulse repetition frequencies. Also, since the energy is depleted from the rod prior to dumping from the system, much shorter pulse widths are obtainable than can be achieved from a conventional Q-switched continuous wave pumped system.

Though the present invention is disclosed and described with relation to the accompanying drawings, we do not wish to be limited to the details shown therein as obvious modifications may be made by those of ordinary skill in the art.

We claim:

1. Method for producing high peak power narrow pulses by means of a laser apparatus, comprising the sequential steps of
    exciting and holding a laser medium of the apparatus for a finite time above an energy threshold required for the laser medium to emit a laser wave,
    permitting the laser medium to emit a laser wave,
    oscillating said wave within the laser apparatus for a finite time by repeatedly reflecting 100 percent of the wave back through the laser medium, and
    rapidly terminating said oscillation, allowing said apparatus to emit a pulse of high peak power and very short duration.

2. Method as in claim 1, wherein said oscillating is carried on for a time sufficient to deplete substantially all of the available energy from the excited laser medium.

3. Method as in claim 1 or 2, wherein 100 percent of the energy emitted by said laser medium is contained within the laser apparatus until said oscillation is terminated, thereby producing a pulse of high peak power.

4. Method as in claim 1 wherein said wave is oscillated between mirrors which are 100 percent reflective.

5. Method as in claim 1 or 4 wherein a switching means is located along the optical path of the oscillating wave, said switching means being switchable from a totally reflective state to a totally transmissive state,
    wherein said switching means is maintained in a totally reflective state during oscillation of said wave thereby facilitating such oscillation, and
    wherein said switching means is rapidly switched to a transmissive state, thereby interrupting said oscillation and causing emission of a high peak power pulse from said laser apparatus.

6. Apparatus for producing high peak power narrow laser pulses, comprising,
    a laser medium,
    means for exciting the laser medium to emit a laser wave,
    means facilitating oscillation of the entire laser wave through said medium,
    shutter means for preventing said oscillation when said shutter means is in a closed condition preventing passage of said wave therethrough, and for permitting said oscillation when in an open condition allowing passage of said wave therethrough, and
    means for rapidly terminating said oscillation and for emitting a narrow width, high power pulse from said apparatus.

7. Apparatus as in claim 6, wherein said means facilitating oscillation of said wave comprises at least two 100 percent reflective mirrors.

8. Apparatus as in claim 6 or 7, comprising a frustrated total internal reflectance device in the path of oscillation of said wave.

9. Apparatus as in claim 6, wherein said means for rapidly terminating oscillation and for emitting a laser pulse comprises an optical device which is switchable from a totally reflective state to a totally transmissive state.

10. Apparatus as in claim 9, wherein said optical device comprises a frustrated total internal reflectance device which reflects 100 percent of said oscillating wave when said device is in a reflective state, and which may be rapidly switched to said totally transmissive state, whereby a narrow width, high power pulse is emitted from the apparatus.

11. Apparatus as in claim 6, wherein said shutter means comprises an acousto-optical modulator.

* * * * *